US012625478B2

(12) United States Patent
SayyarRodsari et al.

(10) Patent No.: US 12,625,478 B2
(45) Date of Patent: May 12, 2026

(54) INDUSTRIAL CONTROLLER HAVING AI-ENABLED MULTICORE ARCHITECTURE

(71) Applicant: Rockwell Automation Technologies, Inc., Mayfield Heights, OH (US)

(72) Inventors: Bijan SayyarRodsari, Austin, TX (US); Dan Li, Austin, TX (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 425 days.

(21) Appl. No.: 18/327,355

(22) Filed: Jun. 1, 2023

(65) Prior Publication Data

US 2024/0402679 A1 Dec. 5, 2024

(51) Int. Cl.
*G05B 13/02* (2006.01)

(52) U.S. Cl.
CPC .................... *G05B 13/0265* (2013.01); *G05B 2219/31368* (2013.01)

(58) Field of Classification Search
None
See application file for complete search history.

(56) References Cited

U.S. PATENT DOCUMENTS

| | | | |
|---|---|---|---|
| 10,754,320 B2 | 8/2020 | Bhatt et al. | |
| 2020/0150614 A1 | 5/2020 | Johnston et al. | |
| 2023/0119664 A1* | 4/2023 | Chakrabarty | ........ G05B 13/048 700/28 |

* cited by examiner

*Primary Examiner* — Ryan A Jarrett
(74) *Attorney, Agent, or Firm* — Amin, Turocy & Watson, LLP

(57) ABSTRACT

An industrial controller supports deterministic execution of control programs (e.g., ladder logic, function block diagrams, structured text, or other such control code) and is also capable of executing non-deterministic execution cycles, including mathematical optimization algorithms—in which a systematic search in a solution space is performed to identify a desired solution—or machine learning algorithms, either of which can be used by the controller to dynamically update the deterministic control program or code based on current or predicted states of the automation system being controlled by the controller.

20 Claims, 13 Drawing Sheets

INDUSTRIAL CONTROLLER HAVING AI-ENABLED MULTICORE ARCHITECTURE

TECHNICAL FIELD

The subject matter disclosed herein relates generally to industrial automation systems, and, in particular, industrial controllers that monitor and control industrial automation systems or processes.

BACKGROUND ART

Since their adoption as critical components of industrial automation systems, industrial controllers have been designed to execute pre-developed deterministic control code (e.g., ladder logic, structured text, function block diagrams, etc.) whose programmatic structures and parameters remain fixed unless rewritten by a developer, and which generate predictable control outputs for a given set of inputs representing the current states of the controlled industrial machine or process. During runtime, the industrial controller executes this control code deterministically at a high frequency execution cycle to ensure that appropriate control commands are timely issued by the controller in response to changes to the states of the automation system.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, an industrial controller is provided, comprising a program execution component configured to execute an industrial control program that causes the industrial controller to monitor and control an industrial automation system in accordance with a first control strategy; and an artificial intelligence (AI) engine component configured to execute a non-deterministic search algorithm that determines, based on analysis of a current operating condition of the automation system, a second control strategy that improves one or more control performance metrics relative to the first control strategy, and to modify the industrial control program in accordance with the second control strategy.

Also, one or more embodiments provide a method, comprising executing, by an industrial controller comprising a processor, an industrial control program that causes the industrial controller to monitor and control an industrial automation system in accordance with a first control strategy; executing, by the industrial controller, a non-deterministic search algorithm that generates, based on analysis of a current operating condition of the automation system, a second control strategy predicted to improve one or more control performance metrics relative to the first control strategy; and in response to generation of the second control strategy predicted to improve the one or more control performance metrics, modifying, by the industrial controller, the industrial control program in accordance with the second control strategy.

Also, according to one or more embodiments, a non-transitory computer-readable medium is provided having stored thereon instructions that, in response to execution, cause an industrial controller comprising a processor to perform operations, the operations comprising executing an industrial control program that causes the industrial controller to monitor and control an industrial automation system in accordance with a first control strategy; executing a non-deterministic search algorithm that determines, based on analysis of a current state of the automation system, a second control strategy estimated to improve one or more control performance metrics relative to the first control strategy; and in response to determination of the second control strategy predicted to improve the one or more control performance metrics, updating the industrial control program in accordance with the second control strategy.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
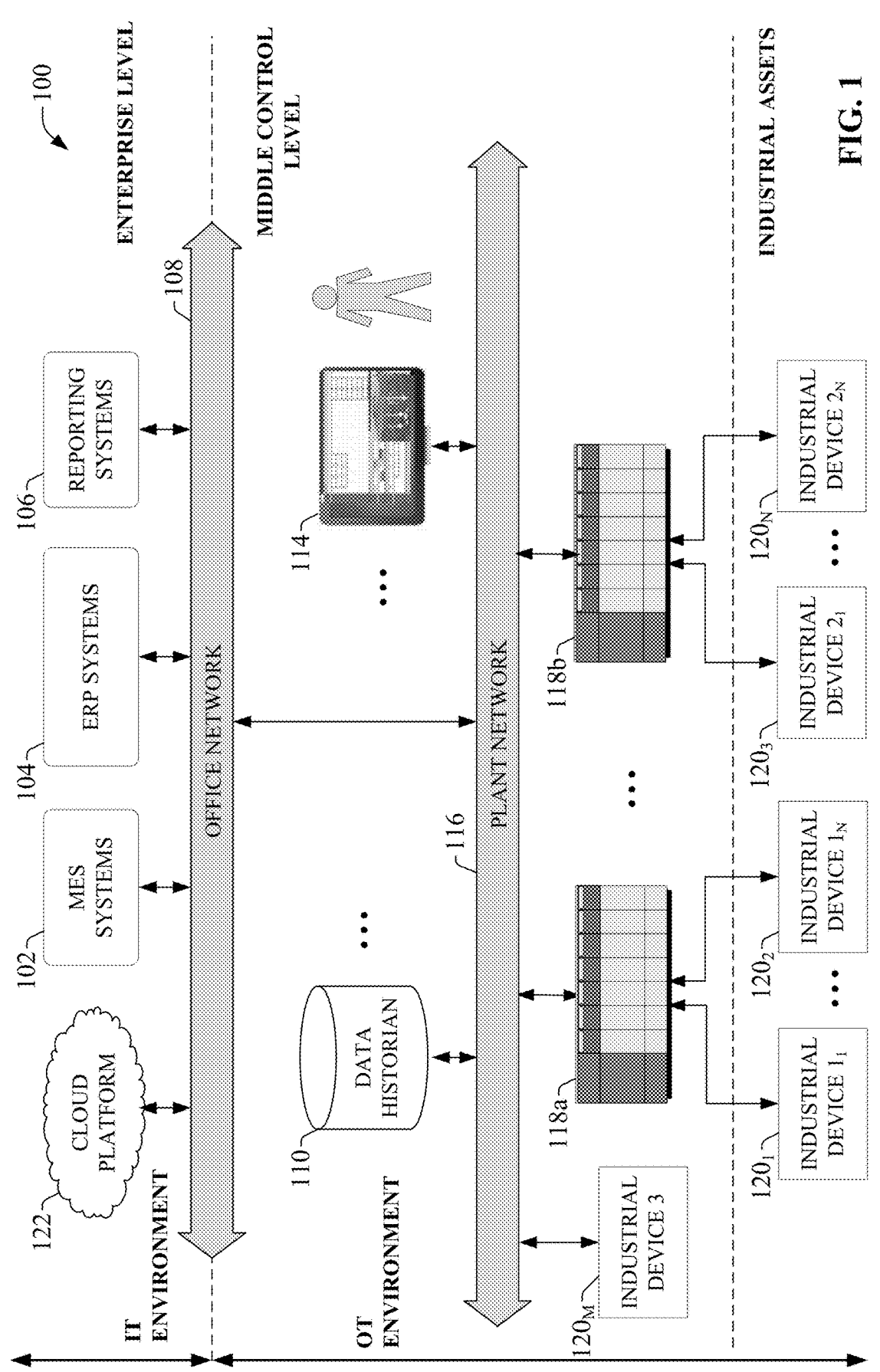
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118—such as programmable logic controllers (PLCs)—are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Since their adoption as critical components of industrial automation systems, industrial controllers 118 have been designed to execute pre-developed deterministic control code (e.g., ladder logic, structured text, function block diagrams, etc.) whose programmatic structures and parameters remain fixed unless rewritten by a developer, and which generate predictable control outputs for a given set of inputs representing the current states of the controlled industrial machine or process. During runtime, the industrial controller executes this control code deterministically at a high frequency execution cycle to ensure that appropriate control commands are timely issued by the controller in response to changes to the states of the automation system. Maintaining the deterministic execution cycles is critical to the overall integrity of the control application, especially if the application requires several actions to be precisely time in series, as in the case of robotics applications.

Current industrial controllers 118 support purely deterministic execution of control code. Because of the inflexibility of the controller's deterministic control program during runtime, controls engineers must anticipate every eventuality of the controlled automation system—e.g., every possible condition or state of the automation system and its associated control devices—and develop the control program in advance to properly handle these eventualities. This approach can result in malfunction of the control system if the automation system experiences an unanticipated state or condition that requires a proper response from the controller 118. Moreover, even if all necessary system states are accounted for in the control program, the control sequences or behaviors encoded in the control program may not yield optimal control performance in all operating conditions or system states.

To address these and other issues, one or more embodiments described herein provide an industrial controller that supports deterministic execution of control programs (e.g., ladder logic, function block diagrams, structured text, or other such control code) and that is also capable of executing non-deterministic execution cycles. To this end, embodiments of the industrial controller can execute mathematical optimization algorithms—in which a systematic search in a solution space is performed to identify a desired solution—or machine learning algorithms, either of which can be used by the controller to dynamically update the deterministic control program or code based on current or predicted states of the automation system being controlled by the controller.

In contrast to industrial controllers that execute purely deterministic execution cycles, software executables with non-deterministic execution cycles can be embedded in embodiments of the industrial controller described herein as part of a deterministic execution loop. Algorithmic features, as well as hardware and data management features that enable these non-deterministic execution cycles and their coordination with the controller's deterministic program execution, are described herein.

Figure 2:
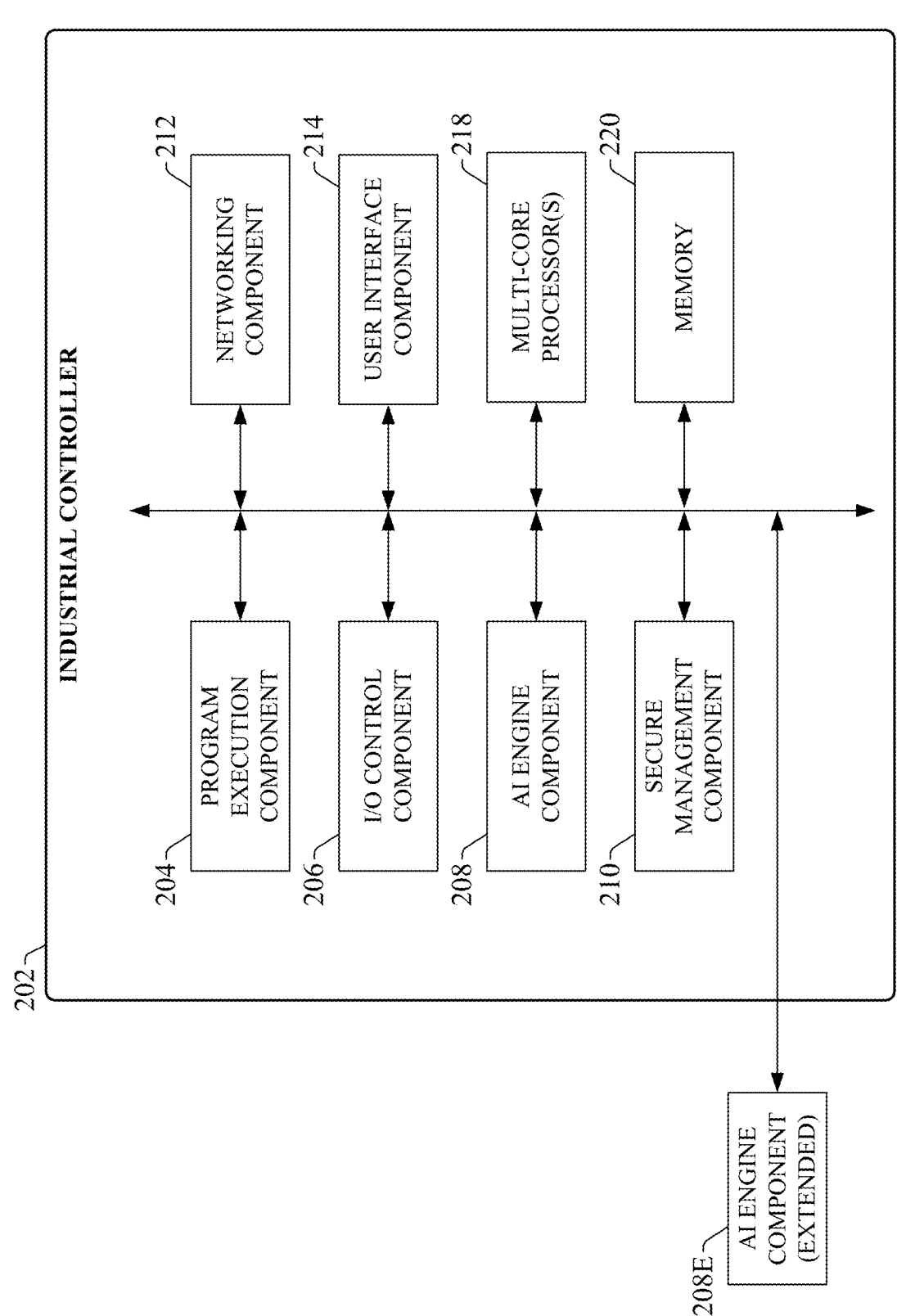
FIG. 2 is a block diagram of an example industrial controller that supports non-deterministic execution cycles.

FIG. 2 is a block diagram of an example industrial controller 202 that supports non-deterministic execution cycles according to one or more embodiments of this disclosure. Industrial controller 202 can be a PLC, a programmable automation controller (PAC), or another type of industrial controller capable of executing industrial control programs (e.g., ladder logic or other types of control code) that process input signals from an automation system and control output signals to the automation system based on this processing. Industrial controller 202 can include a program execution component 204, an I/O control component 206, an AI engine component 208, a secure management component 210, a networking component 212, a user interface component 214, one or more multi-core processors 218, and memory 220. In various embodiments, one or more of the program execution component 204, I/O control component 206, AI engine component 208, secure management component 210, networking component 212, user interface component 214, the one or more multi-core processors 218, and memory 220 can be electrically and/or communicatively coupled to one another to perform one or more of the functions of the industrial controller 202. In some embodiments, components 204, 206, 208, 210, 212, and 214 can comprise software instructions stored on memory 220 and executed by processor(s) 218. Industrial controller 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Program execution component 204 can be configured to compile and execute a user-defined, deterministic control program or executable interpreted code. In various embodiments, the control program can be written in any suitable programming format (e.g., ladder logic, sequential function charts, structured text, C++, Python, Javascript, etc.) and downloaded to the industrial controller 202. Typically, the control program uses data values read by the industrial controller's analog and digital inputs as input variables, and sets values of the industrial controller's analog and digital outputs in accordance with the control program instructions based in part on the input values. I/O control component 206 can be configured to control the electrical output signals of the industrial controller's digital and analog electrical outputs in accordance with the control program outputs, and to convert electrical signals on the industrial controller's analog and digital inputs to data values that can be processed by the program execution component 204.

AI engine component 208 can be configured to execute mathematical optimization or machine learning algorithms designed to determine an optimal control strategy or model for an automation system being controlled by the industrial controller 202, and to modify or replace the currently executing deterministic control program during runtime based on the optimized control model. Networking component 212 can be configured to exchange data with one or more external devices over a wired or wireless network using any suitable network protocol. User interface component 214 can be configured to receive user input and to render output to the user in any suitable format (e.g., visual, audio, tactile, etc.). In some embodiments, user interface component 214 can be configured to communicatively interface with a development application that executes on a client device (e.g., a laptop computer, tablet computer, smart phone, etc.) that is communicatively connected to the industrial controller 202 (e.g., via a hardwired or wireless connection). The user interface component 214 can then receive user input data and render output data via the development application. In other embodiments, user interface component 214 can be configured to generate and serve suitable graphical interface screens to a client device, and exchange data via these graphical interface screens. Input data that can be received via user interface component 214 can include, but is not limited to, user-defined control programs or routines, data tag definitions, first-principle information used by the AI engine component 208 to find an optimized control model, bounds or constraints for a machine learning model used by the controller 202 to determine substantially optimized control strategies, or other such data.

The one or more multi-core processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

In some embodiments, the industrial controller 202 can also interface with an external AI engine component 208E that carries out similar functionality to that of the local AI engine component 208, but executes externally to the controller 202 on a server or cloud platform. That is, the external AI engine component 208E can determine improved control strategies or models for execution on the controller 202 based on execution of mathematical optimization or machine learning algorithms, and can send these recommended strategies to the controller 202, which can implement the control strategy contingent on local validation of the feasibility of the updated control strategy.

Figure 3:
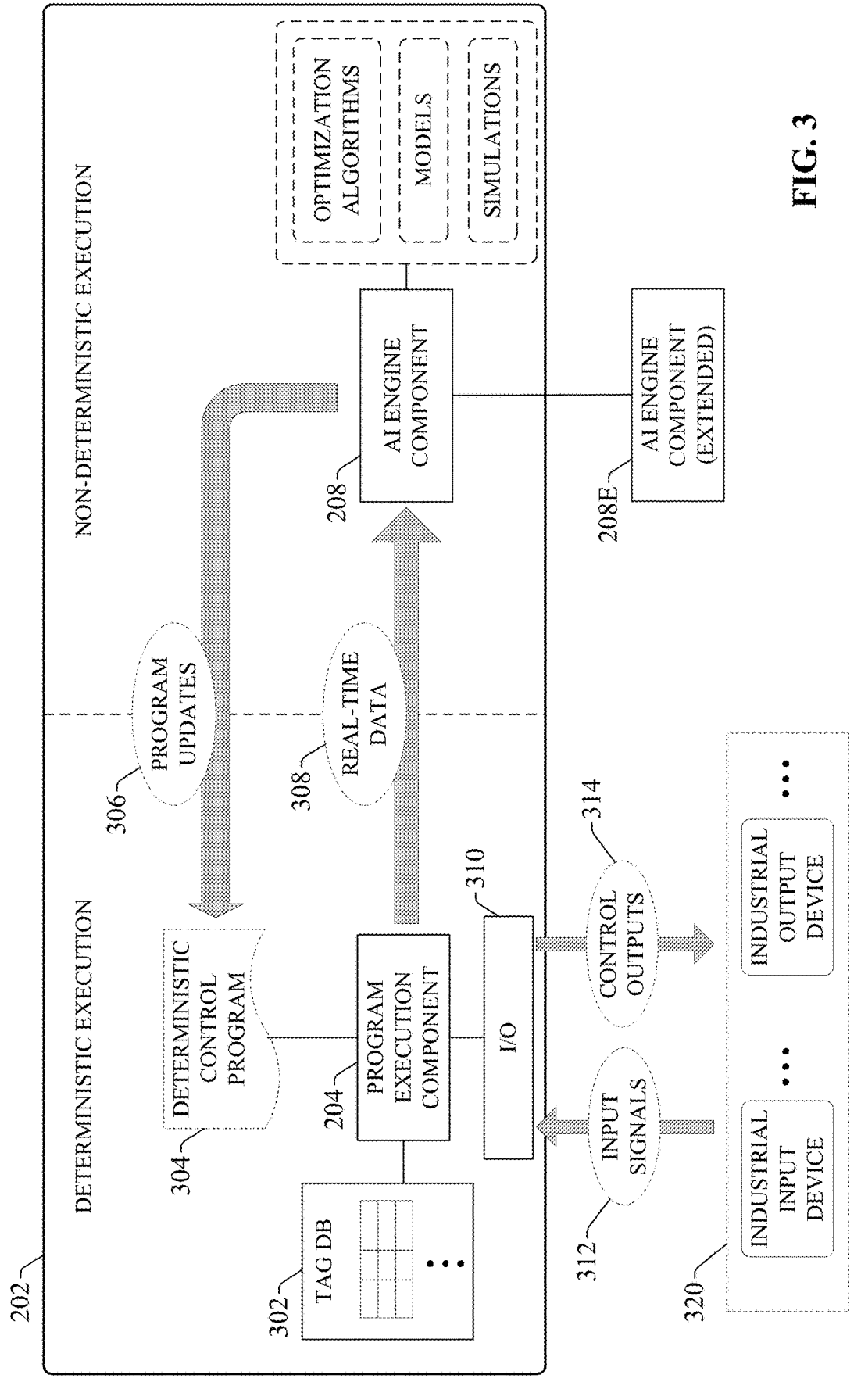
FIG. 3 is a diagram illustrating operation of the AI-enabled industrial controller during runtime.

FIG. 3 is a diagram illustrating operation of the AI-enabled industrial controller 202 during runtime according to one or more embodiments. AI-enabled industrial controller 202 includes a program execution component 204 that executes a control program 304, which may be developed and installed on the controller 202 and which may be at least partially generated by the controller's AI engine component 208 based on execution of mathematical optimization or machine learning algorithms. To facilitate monitoring and control of an industrial automation system 320 during runtime, industrial controller 202 receives input signals 312 from one or more industrial input devices of the automation system 320 (e.g., sensors, telemetry devices, etc.) via the controller's analog and/or digital I/O 310, and the program execution component 204 generates analog and/or digital control outputs 314 directed to one or more industrial output devices of the automation system 320 (e.g., actuators, motor drives, contactors, indicator lights, etc.) based on values of the input signals 312 and control sequences defined by the control program 304. Control outputs 314 can also be initiated in response to, or based on, operator commands received via an HMI 114 or other type of user interface or faceplate. These operator commands can, for example, modify setpoint values or other parameters of the control sequence, initiate or halt control actions, select operating modes for the control sequence, or perform other types of manually initiated actions.

Industrial controller 202 can also include a tag database 302 that stores data tag definitions and their associated values. The data tag definitions, which may be configured by a user in tandem with development of control program 304, define data tags of various data types that are used to store and identify analog and digital data values generated and consumed by the control program 304. Example data types that can be represented by data tags can include, for example, integer data types, real data types, Boolean data types, or other data types. The tag database 302 can store the configured data tags on the industrial controller's memory 220, where the data tags are accessible by the control program 304. The data values maintained in the tag database 302 can include current values of the controller's analog and digital I/O (that is, the values of the input signals 312 and control outputs 314) as well as current values of any variables defined by the control program 304.

In general, the control program 304 can be considered to represent a valid control strategy for monitoring and controlling the automation system 320, defining suitable control sequences for manufacturing a product or material, as well as actions to be taken in response to various states of the automation system 320 (as determined based on the input signals 312 received from the input devices that make up the automation system 320). As noted above, since the control programs executed by purely deterministic industrial controllers are fixed during runtime, controls engineers must typically anticipate all system state and control scenarios that may arise during runtime and develop the control program to properly respond to these contingencies. However, for some automation systems, the fixed control strategy represented by the control program 304 may not be an optimal strategy across all states or operating conditions of the automation system 320. For example, a programmed control sequence used to perform a stage of a manufacturing process may yield acceptable results for a given performance metric—e.g., product quality, product throughput, energy consumption, emissions, etc.—while the automation system is running under a particular range of operating conditions, but may yield substandard results for the performance metric under other operating conditions. The control strategy represented by the control program may even become infeasible if a particular industrial asset on which the control strategy relies—e.g., a sensor, a machine, etc.—becomes unavailable. In the case of closed loop control, the tuning parameters for the control loop may yield acceptable control performance under some operating conditions while yielding deteriorated control under other conditions.

To address these and other issues, in parallel with deterministic execution of control program 304 during runtime, the industrial controller's AI engine component 208 can analyze real-time data 308—comprising measured operational and status information collected from the automation system 320 via input signals 312, as well as data generated by the control program 304 itself in connection with monitoring and control of the automation system 320—using one or both of mathematical optimization algorithms or machine learning algorithms to determine whether the control strategy represented by the currently executing control program 304 can be modified to better suit the current status or operating condition of the automation system 320. Upon predicting that one or more control performance metrics can be improved by updating the control strategy to better suit the current operating conditions, the AI engine component 208 can generate and deploy program updates 306 that modify the current control program 304—or generate a new control program 304—in accordance with the updated control strategy. In this way, the industrial controller 202 uses non-deterministic execution cycles that execute mathematical optimization or machine learning algorithms to modify or replace the deterministic control program 304 to improve control performance given a current state of the automation system 320. In some embodiments, the AI engine component 208 can also execute simulations to determine whether an alternate control strategy will yield improved control performance relative to one or more performance metrics.

Figure 4:
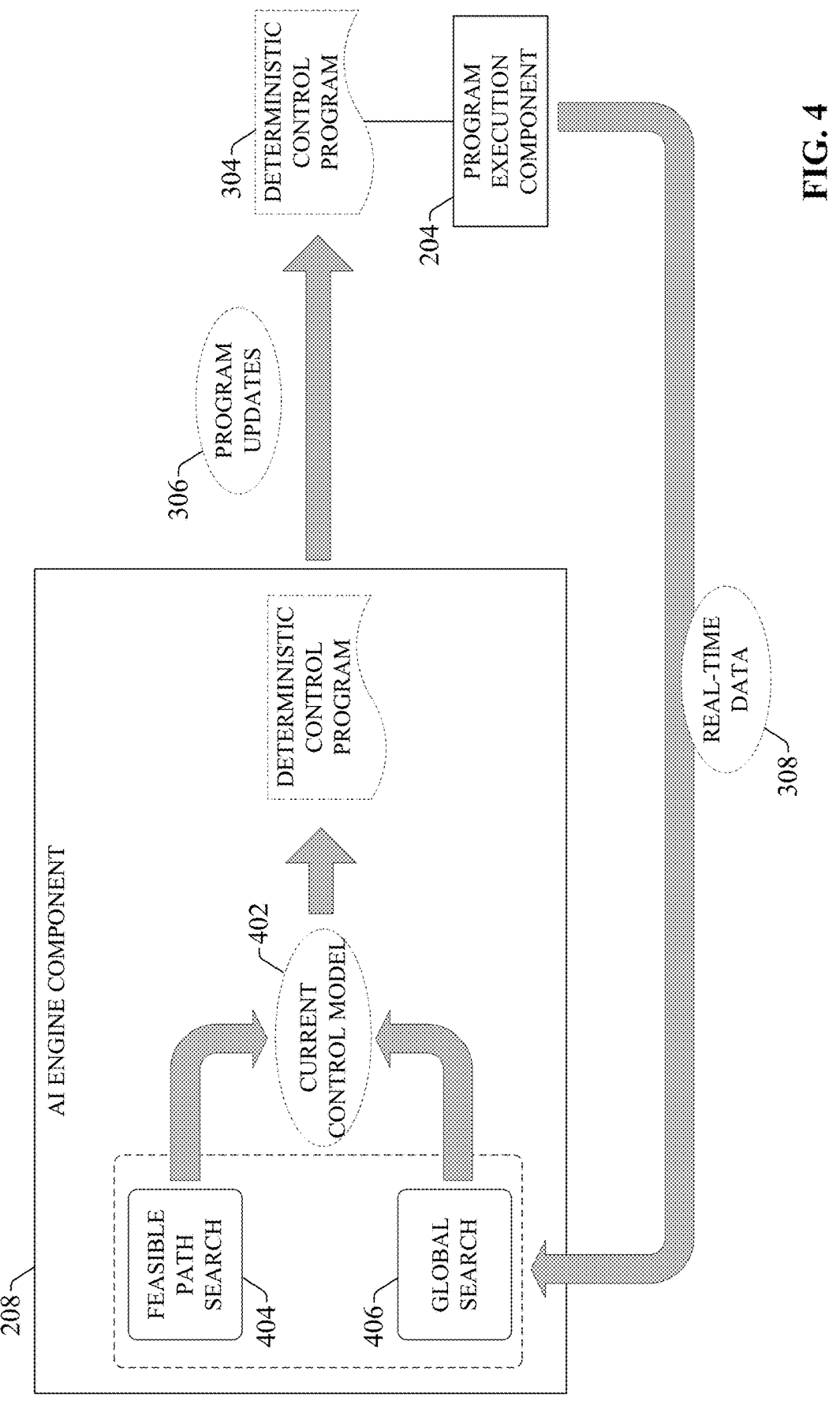
FIG. 4 is a diagram illustrating a general approach that can be carried out by embodiments of an AI engine component of the AI-enabled industrial controller for determining a suitable control strategy for controlling an industrial automation system or process.

FIG. 4 is a diagram illustrating a general approach that can be carried out by embodiments of the AI engine component 208 for determining a suitable control strategy for controlling an industrial automation system or process, and translating the control strategy to an updated deterministic control program 304. As noted above, the current control program 304 being executed by the controller 202 represents a currently active control strategy for monitoring and controlling the industrial automation system 320. This control strategy can be represented or described by a current control model 402 generated by the AI engine component 208 based on execution of non-deterministic optimization or machine learning algorithms against real-time data 308 representing current states of the automation system. The control model 402 can define substantially any aspect of the industrial control process that can be encoded in the control program 304, including but not limited to control sequences and their associated timings, setpoint values (e.g., speed setpoints, pressure setpoints, timeouts, etc.), loop tuning parameters, operating modes of the automation system 320, data sources to be used as input data for the control program (e.g., selected sensors, telemetry devices, or other data sources), output devices to which control outputs are to be sent (e.g., actuators, robot axes, solenoid valves, etc.), or other such control aspects. The AI engine component 208 can translate the control model 402 into the deterministic control program 304 to be executed by the controller 202, such that the control program 304 implements the control strategy represented by the control model 402.

During runtime, the AI engine component 208 can apply mathematical optimization or machine learning algorithms to the real-time data 308 representing current operating conditions of the automation machine to determine whether a different control strategy—that is a control strategy other than that represented by the current control model 402 and currently implemented by control program 304—would yield improved control performance given updated operating conditions of the automation system 320. The improved control performance can be defined in terms of one or more performance metrics of the automation system 320, including but not limited to product quality, product throughput, energy consumption by the automation system, emissions from the automation system, risk of machine downtime, or other such metrics. If operating conditions of the automation system 320 change in such a way that a different control strategy would improve control performance relative to the current strategy, the AI engine component 208 will output a new control model 402 as a solution to an optimization problem defined by the optimization algorithms, and translate this new control model 402 to an updated control program 304 via appropriate program updates 306 (or by otherwise generating a new control program 304).

In some embodiments, as the industrial controller 202 monitors and controls the automation system 320, the AI engine component 208 can perform a search for a feasible control strategy using two separate non-deterministic execution threads. A first thread can execute a global search algorithm 406 that searches for a feasible optimized solution (that is, a feasible control strategy determined to be best suited to current operating conditions of the automation system 320, as determined based on the real-time data 308) across a global solution space. This global search can entail evaluating a range of possible control strategies—including both feasible and non-feasible strategies—in the course of converging on a solution that is both feasible and assumed to be optimal or substantially optimal for the current operating conditions (where a non-feasible strategy refers to a control strategy that cannot feasibly be implemented against the automation system given its hardware or operational parameters). A second thread can execute a feasible path search algorithm 404 that searches for a feasible control strategy over a more limited solution space comprising only feasible solutions that can be implemented by the automation system 320. This feasible path search is inclusive of incremental adaptation of the existing control strategy parameters (for example, tuning of the proportional, integral, and derivative gains of a PID controller).

Figure 5:
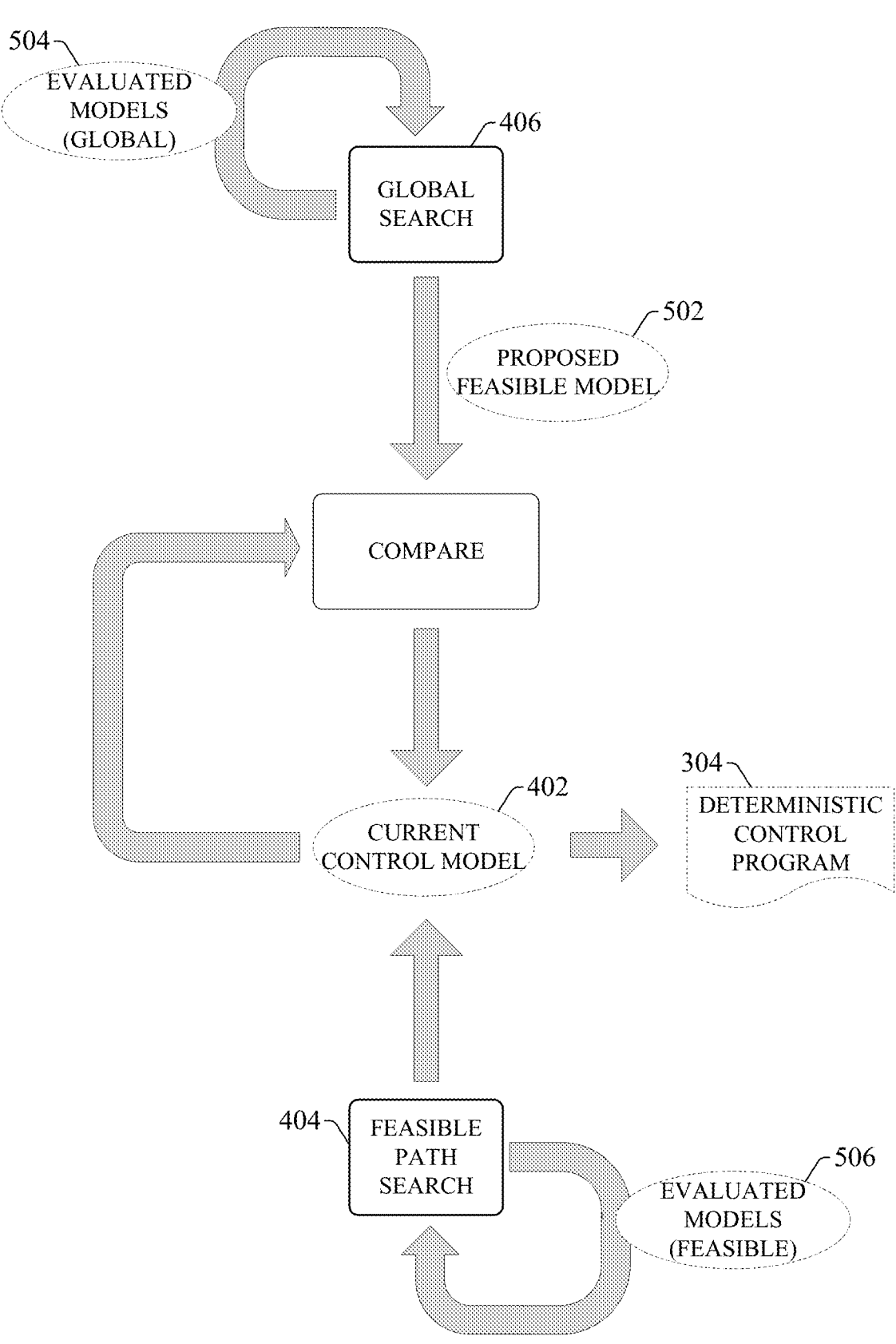
FIG. 5 is a diagram illustrating an example control model evaluation and replacement approach that can be executed by the AI engine component using a global search algorithm and a feasible path search algorithm.

FIG. 5 illustrates an example control model evaluation and replacement approach that can be executed by the AI engine component 208 using the global search algorithm 406 and the feasible path search algorithm 404 according to one or more embodiments. As the industrial controller 202 is monitoring and controlling the automation system 320 using the current control model 402 (from which the currently executing control program 304 is generated), the global search algorithm 406 can continuously or periodically search for a new control model that may offer improved control performance relative to the current model 402. The global search algorithm 406 can leverage, as inputs, selected sets of real-time data 308 representing measured states of the input devices that make up the automation system 320 (as determined from the values of the input signals 312 from those input devices), current values of control outputs 314, calculated values generated by the control program 304 in connection with processing the input signals 312 and generating the control outputs 314, or other relevant data. The global search algorithm 406 can also leverage any fixed constraints—such as physics-based constraints or constraints based on knowledge of the type of industrial process being carried out by the automation system 320—defined by a controls engineer or a vendor of the controller 202.

Based on these inputs and constraints, the global search algorithm 406 can search a global solution space for a proposed feasible model 502 that may offer improved performance over the current control model 402. Since the global search algorithm 406 searches for a feasible model within a global solution space—comprising both feasible and non-feasible solutions—for a feasible model, the global search algorithm 406 may iteratively output and evaluate a number of models 504 which may or may not be feasible in the course of converging on such a feasible solution. Non-feasible solutions represent control strategies that cannot be implemented given the constraints of the automation system 320 being controlled, which may be a function of the current operating state of the automation system 320 (as determined from the real-time data 308) and any defined physical constraints or control rules for the type of control application being performed.

Once the global search algorithm 406 obtains a feasible solution represented by a proposed feasible control model 502, the AI engine component 208 compares the proposed model 502 with the current active control model 402. If this comparison determines that the proposed model 502 would yield an improved overall performance metric relative the current control model 402, the AI engine component 208 sets the proposed feasible model 502 as the current control model 402 and updates the deterministic control program 304 to reflect the new control model 402. The overall performance metric used for comparison may be an aggregation of multiple weighted performance indicators of interest for the controlled process (e.g., product quality, energy consumption, etc.). The AI engine component 208 can use any suitable comparison approach to make the determination as to whether the proposed feasible model 502 will yield an improvement of the overall control performance relative to the current control model 402. This can include, but is not limited to, performing simulations of the two control strategies against a model of the automation system 320 under its current operating condition (that is, the operating condition for which the new control strategy is being determined). Results of the simulations—which may be simulated values of the control performance metrics of interest—can be compared to determine whether the proposed feasible model 502 is expected to yield improved performance over the current control model 402.

Replacement of the current control model 402 and the updating of the control program 304 is performed without interrupting the active control process, and control of the automation system 320 continues using the new control strategy. The updating of the control strategy may involve, for example, altering the steps or timings of a control sequence, adding steps to or removing steps from the control sequence, modifying a control setpoint, updating a loop tuning parameter, adding or removing control routines, instructing the program 304 to use a different source of input data (e.g., a different meter or sensors) for a certain measurement value used in a control sequence, changing the target output device for a control signal, or performing other modifications to the control program.

Since the global search algorithm 406 searches a global solution space for an optimal control solution, the global search algorithm 406 may evaluate a number of non-feasible control solutions while converging on a feasible optimized solution, which is output as a new current control model 402. These non-feasible solutions represent control strategies that cannot be implemented given the constraints of the automation system 320 being controlled. However, real-time control of an automation system 320 requires a feasible solution, embodied as a current control model 402, to be active at all times. Conceivably, the operating conditions of the automation system 320 may change after the last feasible solution was decided, and the current control model 402 that was generated from that solution may not be feasible for the new operating condition. In such scenarios, the previous control model 402 must be replaced with a new feasible control model 402 without interruption of the control process. If the global search algorithm 406 is still in the process of converging on a new feasible control model 502, the current output of the global search algorithm 406 may not be a feasible solution and therefore cannot be used as a replacement for the current model 402 when needed.

To address this, the AI engine component 208 can also execute the feasible path search algorithm 404 in a second execution thread, in parallel with execution of the global search algorithm 406. The feasible path search algorithm 404 searches for a feasible control strategy over a limited solution space of only feasible models 506 that can be implemented by the automation system 320. As such, the output of the feasible path search algorithm 404 at any given time will be a control model 506 representing a feasible control strategy capable of being applied to the automation system 320. The AI engine component 208 can execute the global search algorithm 406 and the feasible path search algorithm 404 on parallel execution threads, with the feasible path search algorithm 404 performing a feasible path search for an optimized control strategy while the global search algorithm 406 performs a global search for an optimized control strategy (which may not remain feasible in the course of the search process).

If the AI engine component 208 determines, based on analysis of the real-time data 308, that a change in the current operating condition of the automation system 320 has rendered the current control model 402 (and corresponding control program 304) infeasible for the current operating condition, the AI engine component 208 can determine whether the current output of the global search algorithm 406—which may be in the process of converging on a proposed feasible model 502—represents a control strategy that is feasible for the current operating condition. If so, the AI engine component 208 uses this output as the new control model 402 and updates the control program 304 in accordance with this new model 402. Alternatively, if the current output of the global search algorithm 406 is not feasible for the current operating condition (e.g., if the global search algorithm 406 is currently evaluating an infeasible solution in the course of converging on a feasible solution), the AI engine component 208 will take the current output of the feasible path search algorithm 404—which is guaranteed to be a feasible control strategy—as the new current control model 402 and updates the control program 304 according to this model.

In some embodiments, one or both of the global search algorithm 406 or the feasible path search algorithm 404 can use trained machine learning models in connection with identifying substantially optimized control strategies and corresponding models 402 for a given operating scenario of the automation system 320. In such embodiments, the industrial controller 202 can support a multi-thread implementation in which one or more first processing threads are dedicated to ensuring that an acceptable control model 402 is always available for use in a closed loop, while a second thread uses new data (such as real-time data 308) for training machine learning models used by the algorithms 404, 406. Models built with traditional deep learning are black box models, and therefore introducing constraints to ensure their suitability for real-time execution may be challenging. To address this, the algorithms 404, 406 can use parameterized symbolic learning (or symbolic computation) to ensure that an active control model 402 is always available for deterministic execution. Parameterized symbolic learning does not use a generic approximator (as in the case of neural networks) but rather uses mathematical functions as the basis for learning.

The use of parameterized symbolic learning can allow industry domain experts to more easily understand the machine learning models used by the algorithms 404, 406. For example, the controller's machine learning model may determine, based on training using real-time data 308, that a measured moisture content is inversely proportional to a measured heat value. The symbolic form of the machine learning model can clearly convey this learned relationship to a domain expert, who can validate the fundamental findings of the model. Parameterized symbolic learning also allows those experts to introduce constraints to the machine learning model based on their own knowledge of the controlled process to ensure the suitability of any resulting control model 402 output by the algorithms 404, 406 based on findings of the machine learning model. These constraints can be submitted, for example, via the controller's user interface component 214, which can render a suitable user interface on a client device communicatively connected to the controller 202 for visualizing findings of the machine learning model (e.g., information about discovered relationships between aspects of the controlled automation system or process) and for receiving user-defined constraints or relationships to be applied to the machine learning.

The use of parameterized symbolic learning can reduce the complexity of the search for a new control model structure in real-time. In general, the computational thread dedicated to identifying an improved control model 402 based on the current operating conditions (as determined based on real-time data 308) would face significate feasibility challenges if the universe of acceptable model structures is not reasonably constrained. Using parameterized symbolic learning as the core building block of empirical modeling can also reduce the challenge of obtaining sufficiently informative data for meaningful learning.

Also, some embodiments of the controller's AI engine component 208 can support the use of physics-based constraints to ensure robust training of an acceptable machine learning model for use by algorithms 404, 406 with reasonable amount of operation data. In this regard, physics-based first principles can serve as a basis of the symbolic learning used by the machine learning model. As an example, if it is known how an aeration process treats ammonia, aspects of this process can be submitted to the algorithms 404, 406 as first-principles information to aid the machine learning model in identifying the basis functions for symbolic learning. While, with a reasonable model structure, parameter retuning may be sufficient to create a sufficiently accurate model 402 for control and optimization, the AI engine component 208 can continuously validate whether the selected model structure is a good representative of current operation state of the automation system 320.

The use of parameterized symbolic models can simplify the process of automatically generating control code in a wide range of applications. By contrast, higher order information from a black-box model is subject to high variability, which would be a major obstacle preventing reliable auto-generation of control code. Fixing the underlying structure of the control program 304 using parameterized symbolic models can greatly simplify automatic generation of control programming. If the control code generation algorithms were to be required to determine the underlying structure of the necessary models, the search space for generation of control would be exponentially more complex. For example, in the case of closed-loop control, determining which PID loops are to be considered is a more complex task than programming the tuning of the parameters of a given PID controller. The use of parameterized symbolic models can reduce the engineering services required for proper generation of a control program 304. In some embodiments, the controller 202 can allow users to submit clear bounds for the parameters as input to be used by the search algorithms 404, 406 for automated generation of control programs 304.

The AI engine component 208 can auto-generate the program updates 306 or control program 304 in part by translating validated first-principle information into efficient rail-guards for monitoring model quality. Embodiments of the AI-enabled industrial controller 202 can use AI's capability to generate optimized control programming to ensure that, at any given time, a feasible and substantially optimized program 304 is active to curate the data that is directed to the machine learning model. Properties of the machine learning model used by the algorithms 404, 406 can be bound based on encoded first-principles information. For example, if the maximum and minimum gains for a transfer function are known, the controller 202 can be programmed to verify the gains from the machine learning model to ensure that the gains are within the pre-defined bounds.

To improve machine learning used by the controller 202 to obtain substantially optimized feasible control models 402, the AI engine component 208 can curate and contextualize data 308 during runtime based on the current state of the automation system operation as well as relevant first-principles guidelines embedded in the controller 202 to create a proper context for the data 308.

Embedding monitoring functionality into the AI-enabled industrial controller 202 can also provide operators with information regarding the data range needed for certification of the control model 402, which can guide judicious interference in operation to enrich the quality of data used for machine learning. For example, in some cases some intentional excitation is required to yield informative data. The artificial intelligence capabilities of industrial controller 202 makes it possible to execute a program that measures the information content of the data 308 (e.g., a measure of variability of data), and prompt an operator to induce a sufficient level of excitation that creates informative data.

Although the examples described above in connection with FIGS. 3-5 have assumed purely local execution of the non-deterministic optimization or machine learning algorithms on the industrial controller 202 by the AI engine component 208, in some embodiments the AI engine component 208 can incorporate an external compute surface—e.g., a server on a common network with the controller 202, a GPU-enabled compute surface optimized for machine learning, or a cloud compute platform—as an extension of the AI engine component 208 (shown as AI engine component 208E in FIG. 2). This external AI engine component 208E can perform any of the functions ascribed herein to the local AI engine component 208, including generation of updated control strategies for the controller 202 based on execution of mathematical optimization or machine learning algorithms and communication of these recommended control strategies to the controller 202 for validation and implementation.

According to an example execution flow, the controller's local AI engine component 208 (or another component of the controller 202) can first exchange validation data with the extended or external AI engine component 208E to validate the external compute surface as an authorized extension of the controller 202. Upon successful validation, the controller 202 can send, to the external AI engine component 208E, data indicative of its current operation condition, the current control strategy being executed by the controller (as implemented by control program 304 and represented by control model 402), any constraints to be considered when searching for an improved control strategy, an acceptable time window for generating a recommended alternative control strategy, or other information that can be used by the external AI engine component 208E to perform a search for an alternative control strategy within a required timeframe. When the AI engine component 208E has converged on a proposed alternative strategy based on execution of mathematical optimization or machine learning algorithms and the information provided by the controller 202 (using techniques similar to those described above), the controller 202 can receive the proposed alternative strategy from the AI engine component 208E (e.g., as a proposed alternative control model), authenticate that the alternative control strategy was sent by the authorized external compute surface, and validate the feasibility of the alternative control strategy. If the controller 202 successfully authenticates the AI engine component 208E and validates the feasibility of its proposed alternative control strategy, the local AI execution component 208 can modify the control program 304 in accordance with the proposed strategy for deterministic execution.

Figure 6:
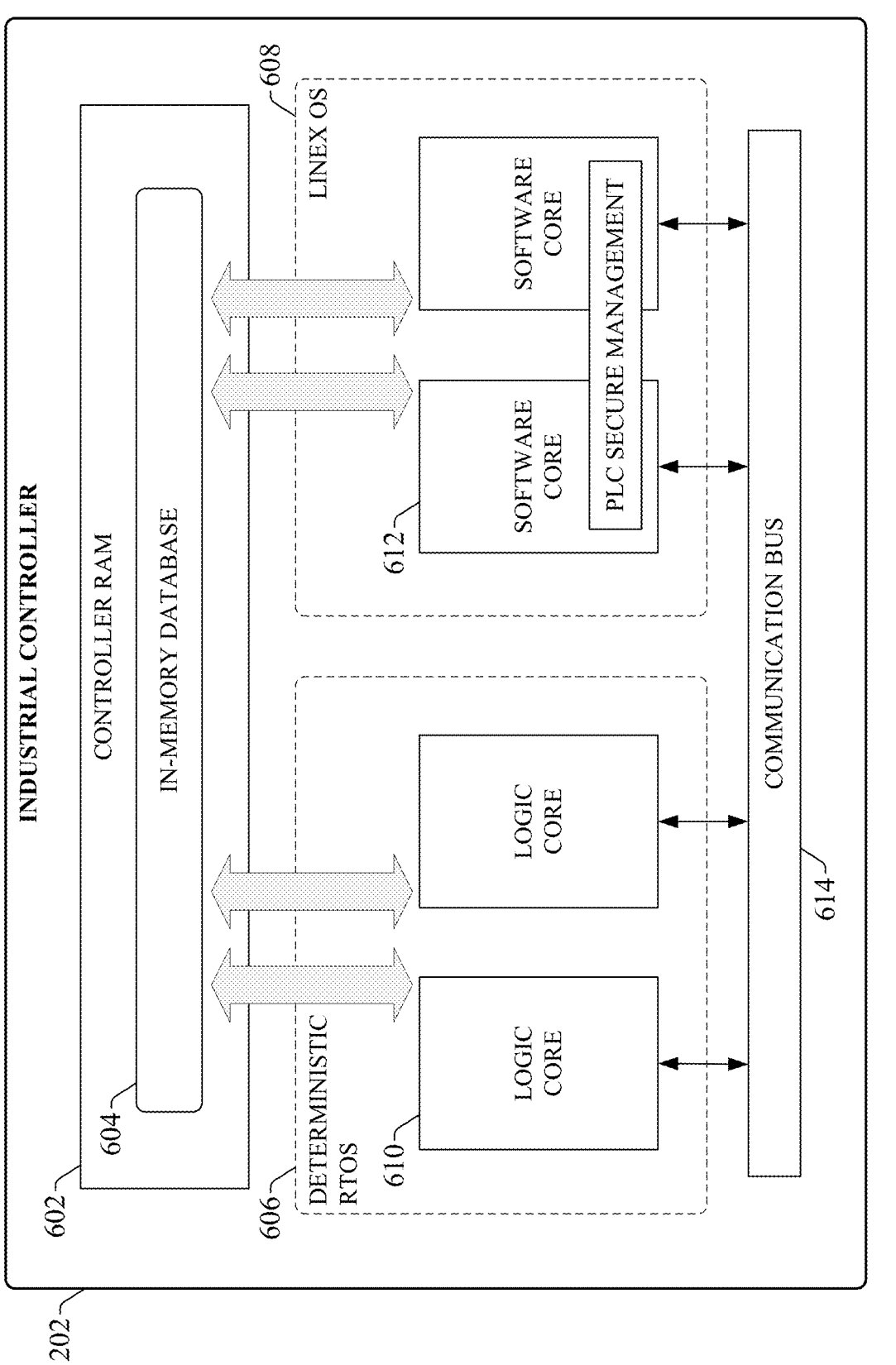
FIG. 6 is a diagram illustrating an example generalized hardware and software architecture for the AI-enabled industrial controller.

From a hardware and data management perspective, the AI-enabled industrial controller 202 can properly synchronize parallel tasks with highly accurate time stamp alignment via potentially asynchronized communication between different control and software programs across different processing cores. FIG. 6 is a diagram illustrating an example generalized hardware and software architecture for the AI-enabled industrial controller 202 according to one or more embodiments. In this example architecture, the deterministic control program 304 can execute on one or more logic cores 610 of a multi-core processor (or multiple processors), while one or more software cores 612 host the AI processing of the AI engine component 208 for both security and applications. Tasks performed on different cores 610, 612 execute in parallel, allowing for time-synchronized executables across the cores 610, 612. The cores 610, 610 can exchange data across a communication bus 614. In some embodiments, the logic cores 610 and software cores 612 may only connect through data for security purposes. The two types of logic cores 610 may also execute on respective to different operating systems in some embodiments. For example, the logic cores 610 may execute on a real-time operating system (RTOS) while the software cores 612 may execute on Linux or another operating system. The Linux cores 612 are equipped for secure remove management.

In some embodiments, the industrial controller 202 can include an in-memory database (IMDB) 604 to enable robust, deterministic, and asynchronous communication between various executables on the industrial controller 202.

Figure 7:
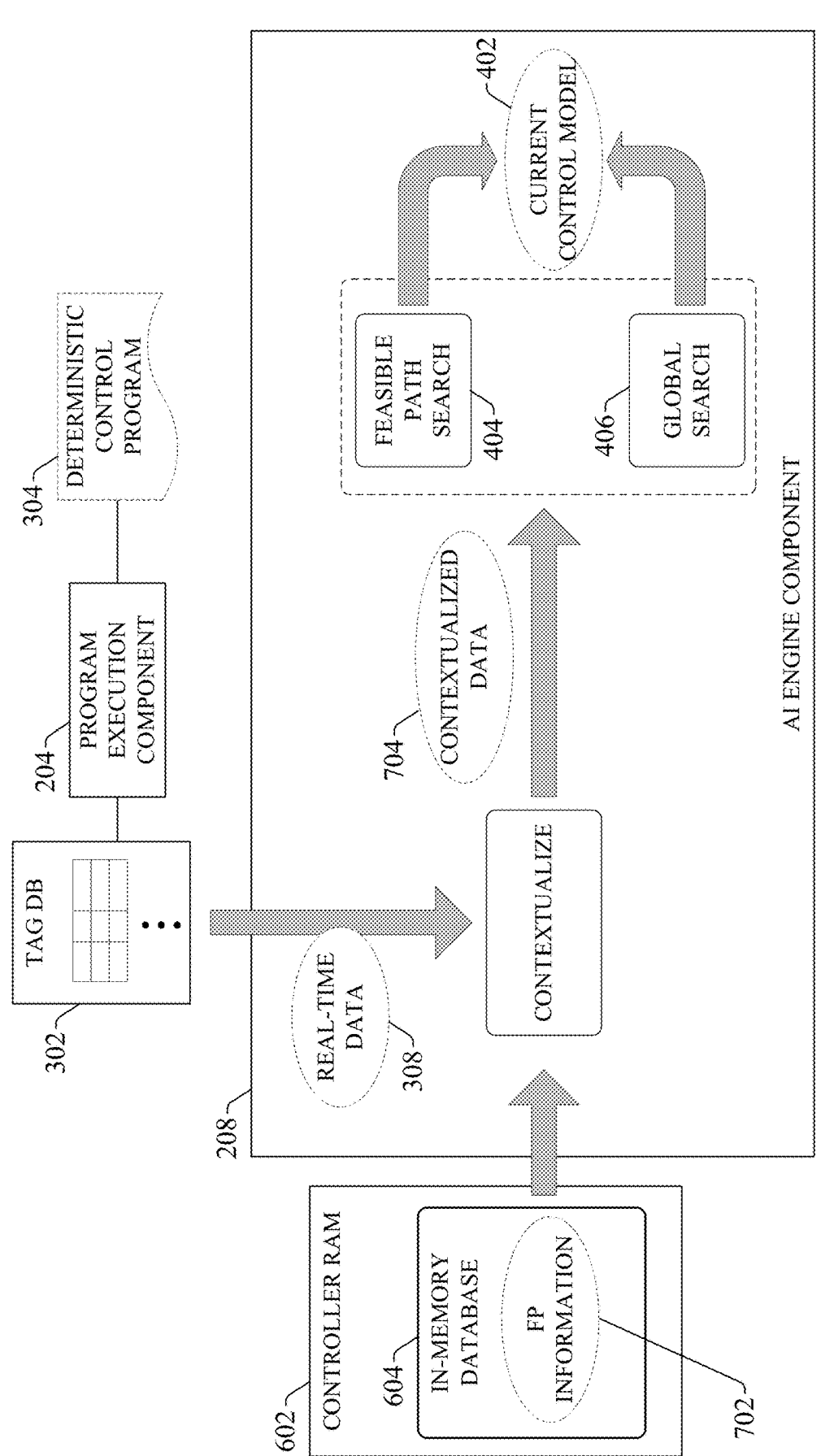
FIG. 7 is a diagram illustrating the AI-enabled industrial controller's use of first-principles information stored in the controller's in-memory database to augment and contextualize real-time data for training of the machine learning models.

The IMDB 604 can utilize a portion of the controller's memory 602 (e.g., the controller's random access memory, or RAM) for data storage, and can be accessed for data reads and data writes by executables on all the cores 610 and 612. The IMDB 604 can hold the first-principles information used by the AI engine component 208 to augment or contextualize the real-time data 308 from the automation system 320. FIG. 7 is a diagram illustrating the controller's use of first-principles information 702 stored in the controller's IMDB 604 to augment and contextualize the real-time data 308 for training of the machine learning models used by the search algorithms 404, 406. As noted above, first-principles information 702 can serve as a basis for the symbolic learning used by the controller's machine learning models. The first-principles information 702 can comprise substantially any known physics-based principle relevant to the industrial application being carried out by the automation system 320, such as information regarding how a material or ingredient is processed during a particular phase of the manufacturing process, maximum or minimum bounds or limits on certain properties or metrics of the controlled industrial process, known causal relationships between events within the industrial process, known mathematical relationships between measured operating metrics or product parameters, a known subset of the real-time data 308 known to be relevant to a given performance metric of the control system as well as mathematical relationships between the subset of data and the performance metric, or other such principles.

The AI engine component 208 can access and apply this first-principles information 702 to the real-time data 308 to enhance the data 308 with additional information that can be used to more quickly and accurately train the machine learning models used by the search algorithms 404, 406. For example, the first-principles information 702 can be used to add contextual metadata to selected items of the real-time data 308 (e.g., metadata defining a data item's mathematical relationship to another data item), to group items of the data 308 in a meaningful manner, to filter data items that are not relevant to a performance metric of interest, or to perform other types of data contextualization. The resulting contextualized data 704 can be used to train the machine learning models in connection with converging on a feasible, substantially optimized control model 402 (and corresponding control program 304) catered to the current operating status or state of the automation system 230.

The IMDB 604 can also hold the data structures used by each of the multiple parallel executables executing on the controller's processing cores 610, 612 at any given time to deterministically complete its execution in parallel to the other executables. As an example, a future control variable trajectory predicted by a model predictive control (MPC) program executing in one core 610, 612 can be made available to an adaptive PID controller running on a separate core 610, 612 as a disturbance to be consumed for feed forward calculation.

The use of an IMDB 604 can simplify the data management scheme between different cores 610, 612 of the AI-enabled industrial controller 202. For one, at any given time, all executables know to send the results of their executions to the IMDB 604, and also know to access the current feasible output of the other executables from the IMDB 604. Also, since the controller 202 uses a universally consistent time stamp to ensure meaningful learning from the streaming real-time data, information generated by an executable will be made available to the other executables via the IMDB 604 with the correct time stamp regardless of the access time. Accurately time-stamped access to the outputs of the controller's various executables allows each deterministic executable to run at a frequency that is most appropriate for the targeted task, independent of how other programs and executables on the controller 202 generate a new feasible solution.

The IMDB 604 can be designed to accommodate various components of combined deterministic and non-deterministic executables in the industrial controller 202. For example, one component of the IMDB 604 can host the current active solution (current control model 402 and its associated control program 304) to ensure that deterministic execution is feasible at all times, while another component of the IMDB 604 can host the hyper-parameters, model structure, and model coefficients for a model that is built based on data for a model-based application (such as control).

The AI-enabled industrial controller 202 can accurately time stamp each data point committed to the IMDB 604 using a single reference frame. Accurate, aligned time stamping of the real-time data 308 as well as the data generated by the control program 304 and the non-deterministic search algorithms 404, 406 can facilitate meaningful coordination between independent executables and controller programs. In an example scenario, the time stamps can be used to properly align a soft sensor for correction against actual sensor data for closed loop control. Correctly aligned time stamping can also improve runtime efficiency, since accurate time stamping capability makes it possible to run interconnected tasks with different execution frequencies in real-time.

The time stamping strategy carried out by the industrial controller 202 also helps the AI engine component 208 to create meaningful context for the real-time data 308. For example, if the controller 202 is executing a production recipe in connection with controlling the automation system 320 to manufacture a type of part or material, applying exact time stamps to the various steps in the recipe as they are performed yields proper contextualization of the controller-level process data.

In some embodiments, the controller's AI engine component 208 can use artificial intelligence (including search algorithms 404 and 406) to automatically generate an updated control model 402 and corresponding control code (in the form of control program 304 or a portion thereof) in response to observed behavior of the automation system 320 (as determined from the input signals 312 received from the automation system 320). This observed behavior can include, for example, process measurements or calculated key performance indicators (KPIs) that determine how the behavior of the automation system 320 compares to a desired behavior (as defined by the operation, or determined automatically via an optimization solution obtained by the search algorithms 404, 406). The AI engine component 208 can also generate a new control model 402 based on new operation guidelines submitted to the controller 202 as business inputs. For example, a user can submit (via user interface component 214) a new business objective to limit emissions from the automation system 320 below a certain threshold, or a newly discovered constraint on availability of a raw material used by the automation system 320 in connection with carrying out an industrial process. In some embodiments, the controller 202 can also allow users to submit new information about the health of an asset included in the automation system 320 (e.g., a new performance constraint of a machine or device) or feedback about the quality of a product produced by the automation system 320 as obtained from online or offline quality tests, and the AI engine component 208 can use this information to further train the machine learning models or to update the parameters or constraints of the search algorithms 404, 406 so that the updated control model 402 will take these factors into consideration.

Automated control code generation using artificial intelligence, as described herein, can greatly simplify the task of programming an industrial controller. Under existing paradigms, engineers must anticipate every eventuality of the automation system 320 to be monitored and controlled, and develop the control program to properly handle these contingencies prior to deployment. With the AI-enabled industrial controller 202, a substantially optimized control program 304 will be generated when needed based on guidelines submitted by plant engineers as well as the observed operation data received from the automation system 320 during runtime. As discussed above, the use of parameterized symbolic models can simplify this process of automatically generating control code in a wide range of applications. An on-board learning system can monitor the activation of control program 304 in the course of real-time execution and learn to optimize the control program 304 in response to changing operating conditions of the automation system 320. This learning-based optimization can be critical to many potential applications where sub-millisecond execution frequencies are desirable.

Figure 8:
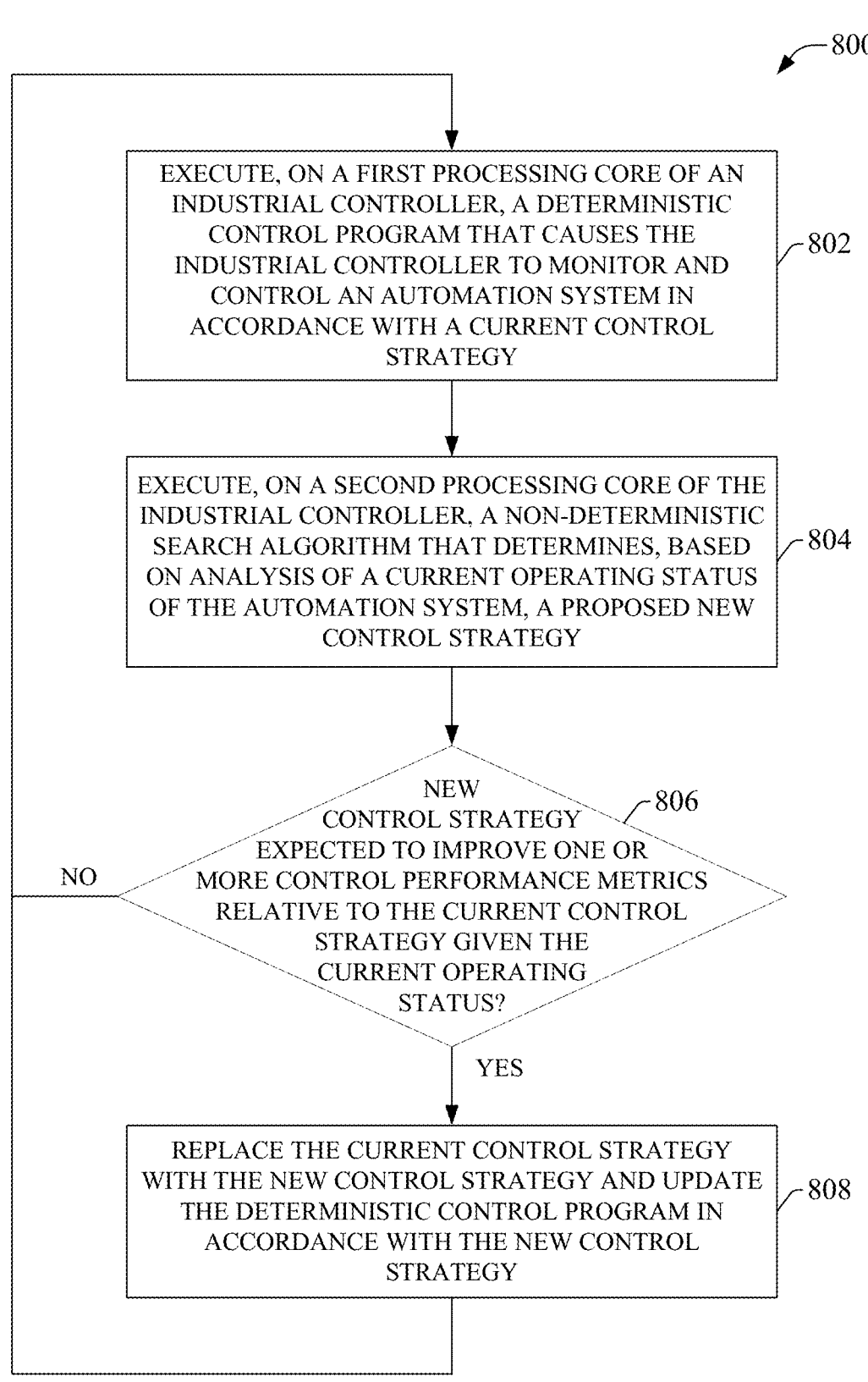
FIG. 8 is a flowchart of an example methodology for dynamically modifying a deterministic control program executing on an industrial controller to improve one or more control performance metrics using a non-deterministic search algorithm that also executes on the industrial controller.
Figure 9A:
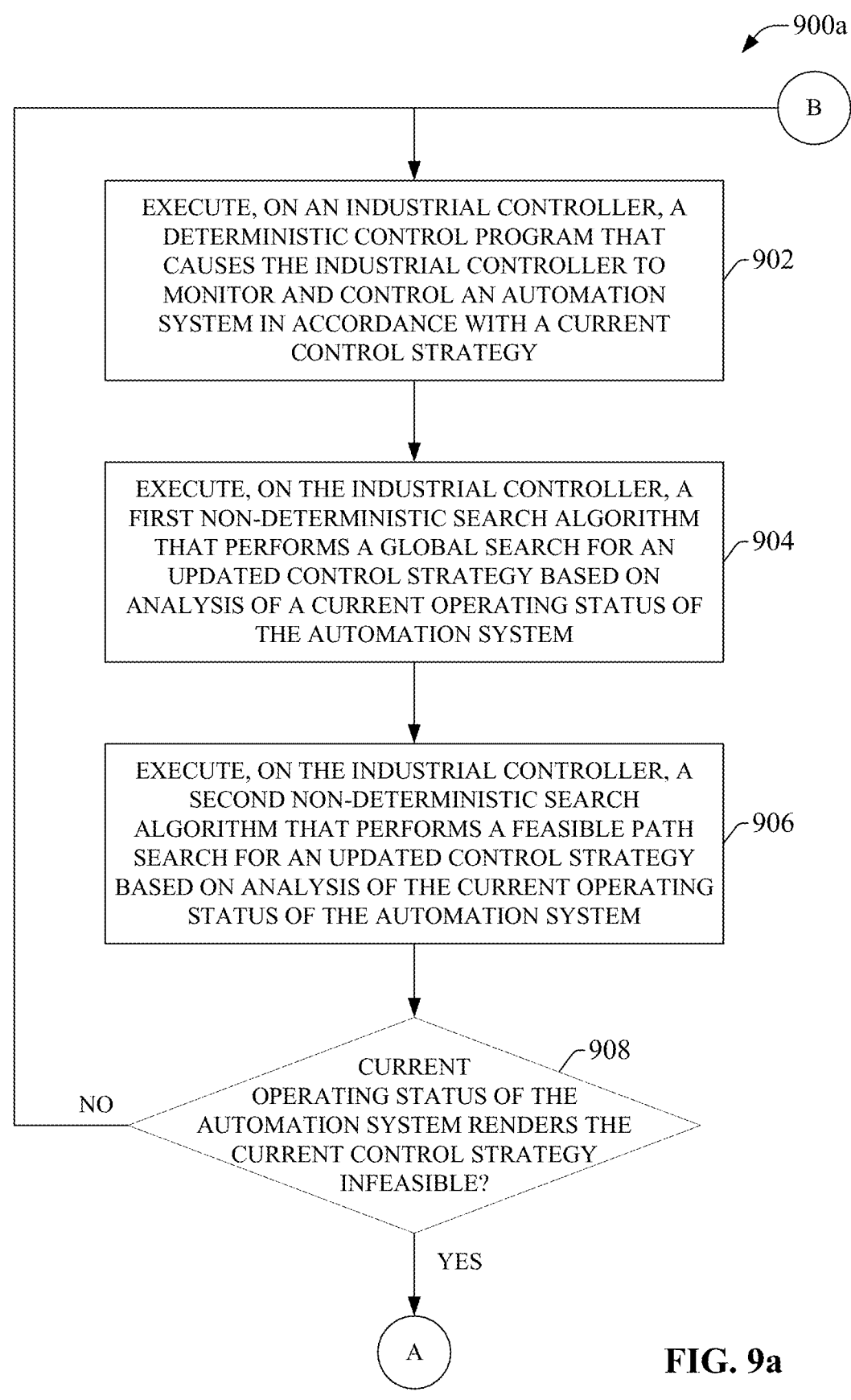
FIG. 9a is a flowchart of a first part of an example methodology for dynamically modifying a deterministic control program executing on an industrial controller to improve one or more control performance metrics using both a non-deterministic global search algorithm and a non-deterministic feasible path search algorithm.
Figure 9B:
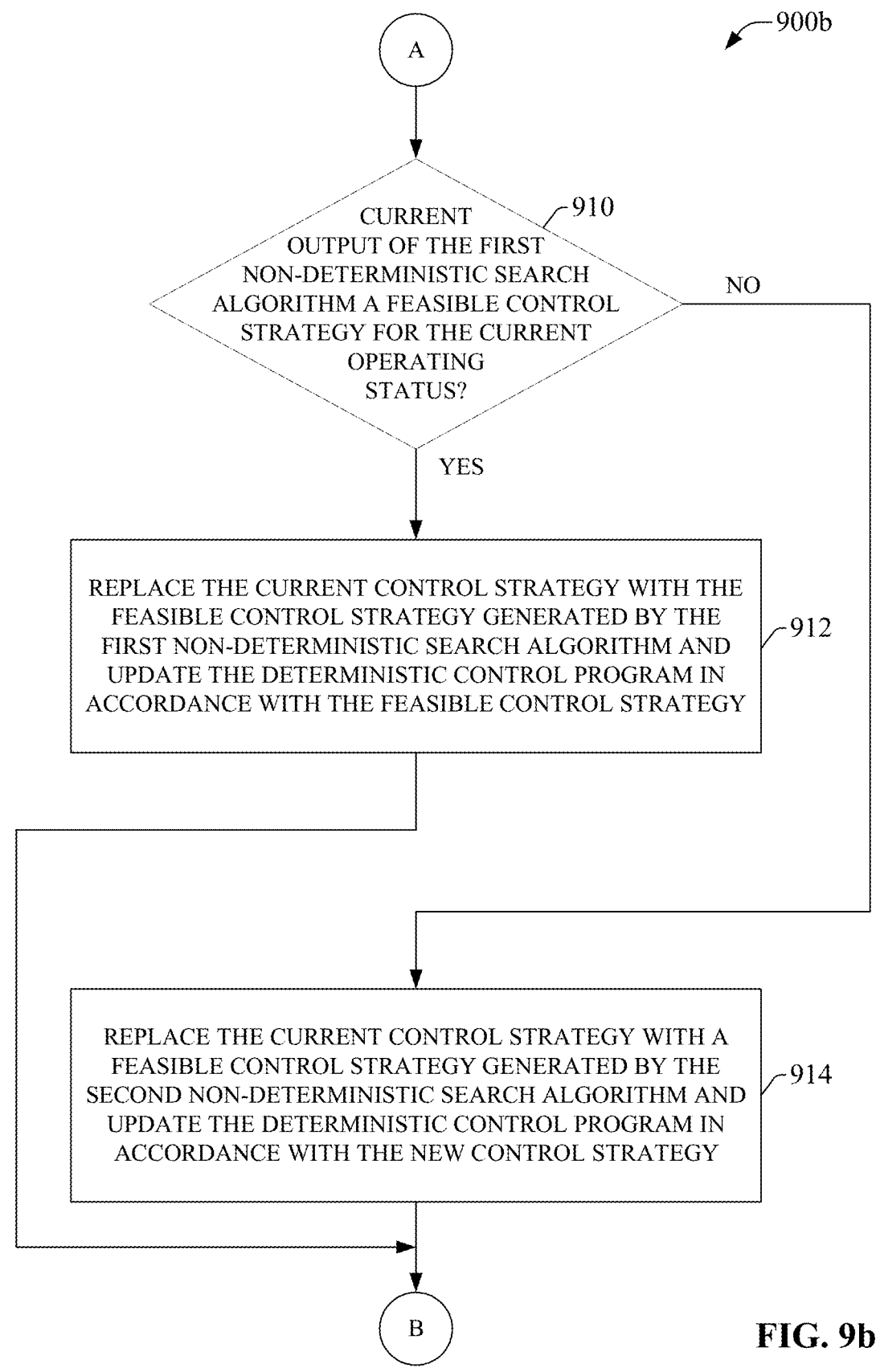
FIG. 9b is a flowchart of a second part of the example methodology for dynamically modifying the deterministic control program to improve one or more control performance metrics using both the non-deterministic global search algorithm and the non-deterministic feasible path search algorithm.
Figure 10:
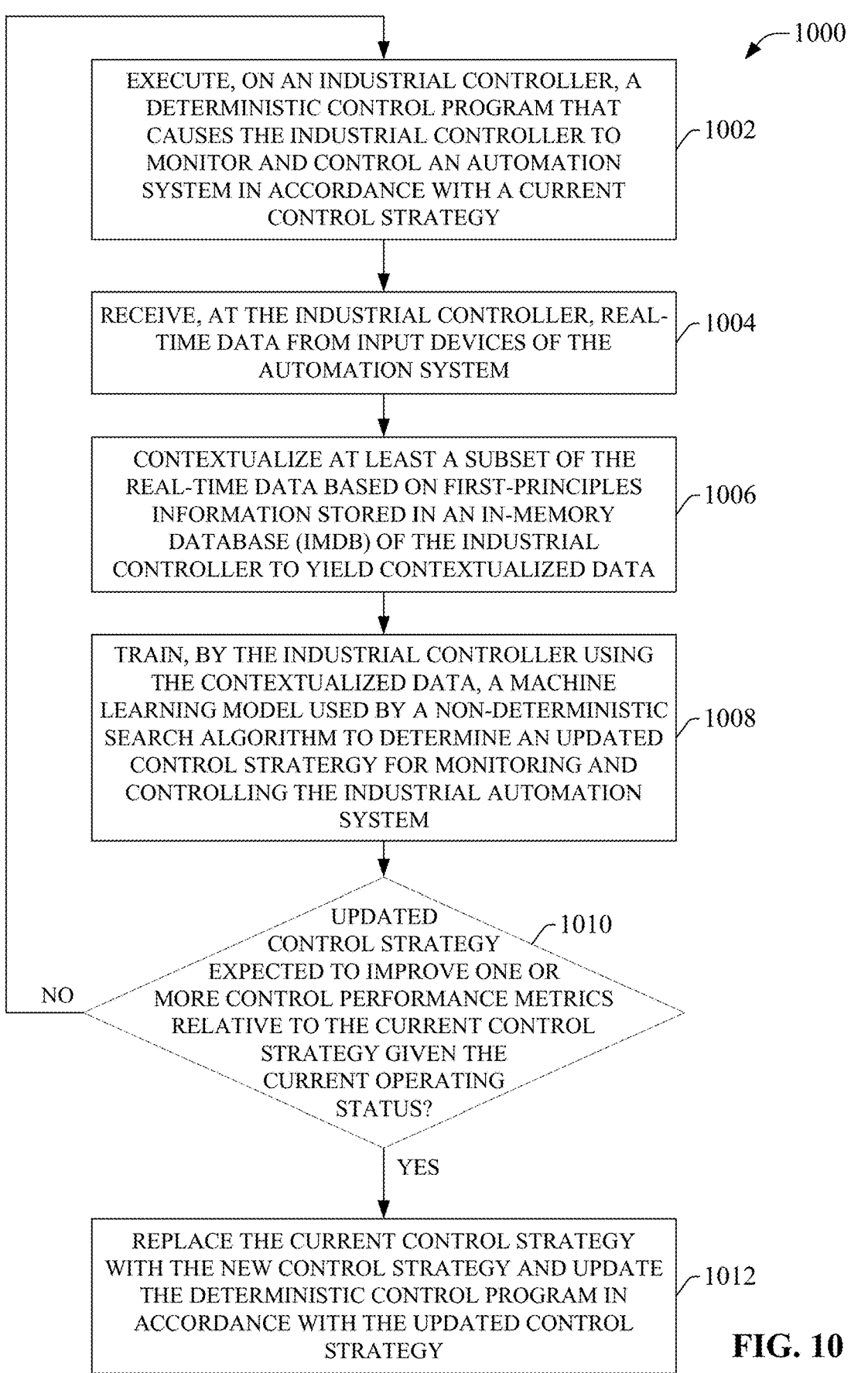
FIG. 10 is a flowchart of an example methodology for training machine learning models on an industrial controller that dynamically update the controller's deterministic control program in accordance with updated control strategies expected to improve one or more control performance metrics.

FIGS. 8-10 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for dynamically modifying a deterministic control program executing on an industrial controller to improve one or more control performance metrics using a non-deterministic search algorithm that also executes on the industrial controller. Initially, at 802, a deterministic control program is executed on a first processing core of an industrial controller. Execution of the control program causes the industrial controller to monitor and control an automation system in accordance with a current control strategy encoded as the control program. The control program can be any suitable type of control code, including but not limited to ladder logic, structured text, a sequential function chart, a function block diagram, or other types of control programming.

At 804, a non-deterministic search algorithm is executed on a second processing core of the industrial controller in parallel with execution of the deterministic control program. The non-deterministic search algorithm is designed to determine, based on analysis of a current operating status of the automation system being monitored and controlled, a proposed new control strategy that may improve one or more control performance metrics relative to the current control strategy implemented by the current control program. The non-deterministic search algorithm can be one or both of a global search algorithm or a feasible path search algorithm.

At 806, a determination is made as to whether a new control strategy determined by the non-deterministic search algorithm is expected to improve one or more control performance metrics relative to the current control strategy, given the current operating status of the automation system. In some embodiments, this determination can be made based on simulations of the two control strategies against a model of the automation system under its current operating condition, which can yield expected performance metrics for the two control strategies for comparison. Other approaches for determining the relative control performance metrics of the two competing control strategies are also within the scope of one or more embodiments. The control performance metrics can be, for example, product quality, product throughput, energy consumption, emissions, risk of machine downtime, or other such metrics.

If the new control strategy is not expected to improve the performance metrics relative to the current control strategy (NO at step 806), the methodology returns to step 802. Alternatively, if the new control strategy is expected to improve the performance metrics relative to the current control strategy (YES at step 806), the methodology proceeds to step 808, where the current control strategy is replaced with the new control strategy, and the control program is updated in accordance with the new control strategy. Control of the automation system by the industrial controller continues using the updated control program.

FIG. 9*a* illustrates a first part of an example methodology 900*a* for dynamically modifying a deterministic control program executing on an industrial controller to improve one or more control performance metrics using both a global search algorithm and a feasible path search algorithm, both of which also execute on the industrial controller. Initially, at 902, a deterministic control program is executed on the industrial controller, causing the industrial controller to monitor and control an automation system in accordance with a current control strategy. At 904, a first non-deterministic search algorithm is executed on the industrial controller in parallel with execution of the control program. This first non-deterministic search algorithm performs a global search for an updated control strategy that may improve one or more control performance metrics relative to the current control strategy based on analysis of a current operating status of the automation system.

At 906, a second non-deterministic search algorithm is executed on the industrial controller in parallel with execution of the control program and the first non-deterministic search algorithm. This second non-deterministic control algorithm performs a feasible path search for an updated control strategy that may improve the one or more control performance metrics relative to the current control strategy based on analysis of the current operating status of the automation system.

At 908, a determination is made as to whether a change in the current operating condition of the automation system renders the current control strategy infeasible. Example scenarios in which a change in the current operating condition renders the control strategy infeasible can include, but are not limited to, a transition of a machine to an operating mode that is not accounted for in the current control strategy, an unexpected loss or disablement of an asset of the automation system (e.g., a machine, a sensor, a control device, etc.) on which the current control strategy depends, or other such scenarios.

If it is determined that the current operating status does not render the current control status infeasible (NO at step 908), the methodology returns to step 902. Alternatively, if the current operating status is determined to render the current control strategy infeasible (YES at step 908), the methodology proceeds to the second part of the example methodology 900b illustrated in FIG. 9b.

At 910, a determination is made as to whether the current output of the first non-deterministic search algorithm—that is, the global search algorithm—is a feasible control strategy for the current operating status of the automation system. In this regard, since the global search algorithm searches a global solution space for a feasible control strategy, that algorithm may currently be evaluating a control strategy that cannot be feasibly implemented for control of the automation system. If the current solution output is a control strategy that can be feasibly implemented for control of the automation system (YES at step 910), the methodology proceeds to step 912, where the current control strategy is replaced with the feasible control strategy output by the first non-deterministic (global) search algorithm, and the deterministic control program is updated in accordance with this feasible control strategy.

Alternatively, if the current output of the first non-deterministic search algorithm is not a feasible control strategy (NO at step 910), the methodology proceeds to step 914, where the current control strategy is instead replaced with a feasible control strategy generated by the second non-deterministic search algorithm, and the deterministic control program is updated in accordance with this new control strategy. Since the second non-deterministic search algorithm searches only feasible solution paths for a viable control strategy, the output of the second non-deterministic algorithm is guaranteed to be a feasible control strategy at all times, and so can be used to replace the current control strategy if the current control strategy becomes infeasible and the global search algorithm has not yet converged on a feasible control strategy.

FIG. 10 illustrates an example methodology 1000 for training machine learning models on an industrial controller that dynamically update the controller's deterministic control program in accordance with updated control strategies expected to improve one or more control performance metrics. Initially, at 1002, a deterministic control program executes on an industrial controller, causing the industrial controller to monitor and control an automation system in accordance with a current control strategy. At 1004 real-time data from input devices of the automation system are received at the industrial controller for processing by the control program.

At 1006, at least a subset of the real-time data—which can also include data values generated by the control program in connection with processing the input signals from the automation system and controlling output signals to the automation system's control devices—are contextualized based on first-principles information stored in an in-memory database (IMDB) of the industrial controller to yield contextualized data. This first-principles information comprise substantially any physics-based principle relevant to the industrial application being carried out by the automation system, including but not limited to information regarding how a material or ingredient is processed during a particular phase of the manufacturing process, maximum or minimum bounds or limits on certain properties or metrics of the controlled industrial process, known causal relationships between events within the industrial process, mathematical relationships between measured operating metrics or product parameters, a subset of the real-time data known to be relevant to a control performance metric as well as mathematical relationships between the subset of data and the performance metric, or other such information. This first-principles information can be used to add contextual metadata to selected items of the real-time data (e.g., metadata defining a data item's mathematical relationship to another data item), to group data in a meaningful manner, to filter data that is not relevant to a performance metric of interest, or to perform other types of data contextualization.

At 1008, the controller uses the contextualized data to train a machine learning model used by a non-deterministic search algorithm (e.g., a global search algorithm or a feasible path search algorithm) to determine an updated control strategy for monitoring and controlling the industrial automation system. At 1010, a determination is made as to whether an updated control strategy obtained by the non-deterministic search algorithm—using the trained machine learning model—is expected to improve one or more control performance metrics relative to the current control strategy given the current operating status or condition of the automation system. If the updated control strategy is not expected to improve the performance metrics (NO at step 1010), the methodology returns to step 1002. Alternatively, if the updated control strategy is predicted to improve the one or more control performance metrics (YES at step 1010), the methodology proceeds to step 1012, where the current control strategy is replaced with the new control strategy, and the deterministic control program is updated in accordance with the updated control strategy.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LAN, WANs, proxies, gateways, routers, firewalls, virtual private network (VPN) devices, servers, clients, computers, configuration tools, monitoring tools, and/or other devices.

Figure 11:
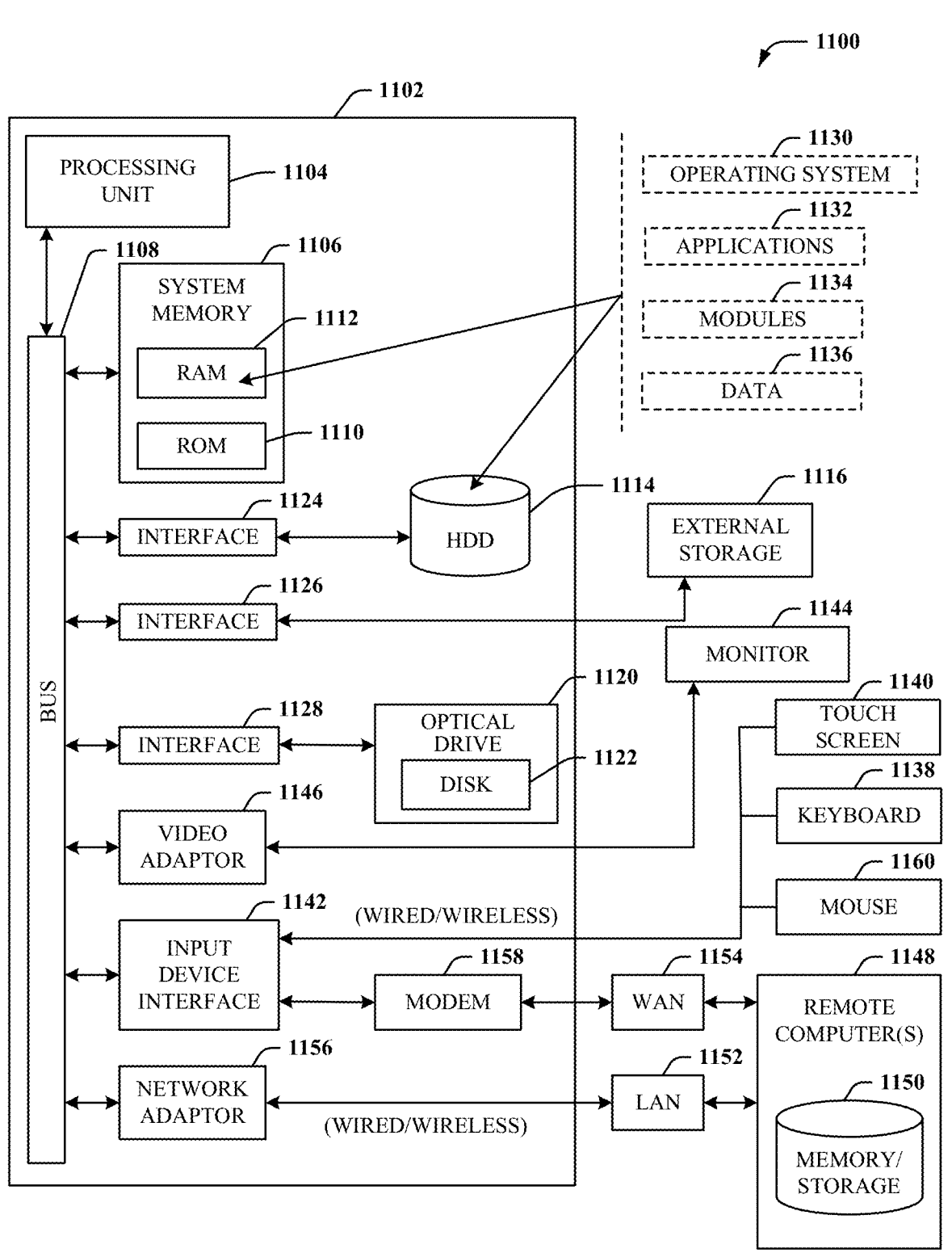
FIG. 11 is an example computing environment.
Figure 12:
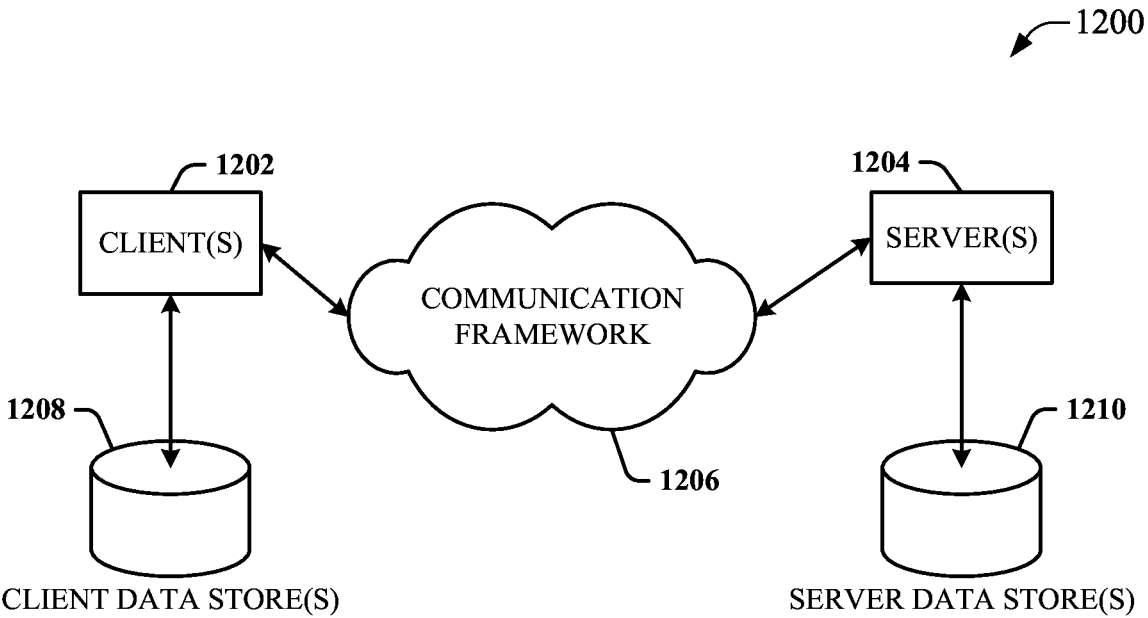
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for application programs 1132. Runtime environments are consistent execution environments that allow application programs 1132 to run on any operating system that includes the runtime environment. Similarly, operating system 1130 can support containers, and application programs 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 2060. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1148. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the adapter 1156 in a wireless mode.

When used in a WAN networking environment, the computer 1102 can include a modem 1158 or can be connected to a communications server on the WAN 1154 via other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1152 or WAN 1154 e.g., by the adapter 1156 or modem 1158, respectively. Upon connecting the computer 1102 to an associated cloud storage system, the external storage interface 1126 can, with the aid of the adapter 1156 and/or modem 1158, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial controller, comprising:
a memory that stores executable components; and
a processor, operatively coupled to the memory, that executes the executable components, the executable components comprising:
a program execution component configured to execute an industrial control program that causes the industrial controller to monitor and control an industrial automation system in accordance with a current control strategy; and
an artificial intelligence (AI) engine component configured to
execute a first non-deterministic search algorithm that performs a global search for a first replacement control strategy determined, based on analysis of a current operating condition of the industrial automation system, to improve one or more control performance metrics relative to the current control strategy,
in response to determining that a change in the current operating condition renders the current control strategy infeasible and that the first replacement control strategy output by the first non-deterministic search algorithm is feasible for the current operating condition, replace the current control strategy with the first replacement control strategy, and
in response to determining that the change in the current operating condition renders the current control strategy infeasible and that the first replacement control strategy is not feasible for the current operating condition, replace the current control strategy with a second replacement control strategy that is output by a second non-deterministic search algorithm that performs a feasible path search for the second replacement control strategy.

2. The industrial controller of claim 1, wherein the industrial control program executes on a first processor core of the industrial controller and at least one of the first non-deterministic search algorithm or the second non-deterministic search algorithm executes on a second processor core of the industrial controller that is separate from the first processor core.

3. The industrial controller of claim 1, wherein the AI engine component is configured to train, using data collected from the industrial automation system, a machine learning model used by the first non-deterministic search algorithm or the second non-deterministic search algorithm to analyze the current operating condition of the industrial automation system and determine the first replacement control strategy or the second replacement control strategy.

4. The industrial controller of claim 3, wherein the AI engine component is configured to add contextual information to the data collected from the industrial automation system based on first-principles information stored on the industrial controller to yield contextualized data, and to train the machine learning model using the contextualized data.

5. The industrial controller of claim 4, wherein the first-principles information is stored on an in-memory database of the industrial controller.

6. The industrial controller of claim 4, wherein the first-principles information comprises at least one of information regarding how a material or ingredient is processed during a phase of a manufacturing process carried out by the industrial automation system, a maximum or minimum bound on a properties of the manufacturing process, a causal relationship between events within the manufacturing process, a mathematical relationship between measured operating metrics of the manufacturing process, identification of data items known to be relevant to the one or more control performance metrics, or mathematical relationships between the data items and the one or more control performance metrics.

7. The industrial controller of claim 3, wherein the machine learning model uses parameterized symbolic learning.

8. The industrial controller of claim 1, wherein the industrial control program and at least one of the first non-deterministic search algorithm or the second non-deterministic search algorithm share results of their execution via an in-memory database of the industrial controller.

9. The industrial controller of claim 1, wherein the one or more control performance metrics comprise at least one of product quality, product throughput, energy consumption by the industrial automation system, emissions from the industrial automation system, or risk of downtime to a machine of the industrial automation system.

10. The industrial controller of claim 1, wherein the AI engine component is further configured to modify the industrial control program in accordance with the first replacement control strategy or the second replacement control strategy.

11. A method, comprising:

executing, by an industrial controller comprising a processor, an industrial control program that causes the industrial controller to monitor and control an industrial automation system in accordance with a current control strategy;

executing, by the industrial controller, a first non-deterministic search algorithm that generates, based on analysis of a current operating condition of the industrial automation system, a first replacement control strategy predicted to improve one or more control performance metrics relative to the current control strategy, wherein the first non-deterministic search algorithm performs a global search for the first replacement control strategy;

in response to determining that a change in the current operating condition renders the current control strategy infeasible and that the first replacement control strategy generated by the first non-deterministic search algorithm is feasible for the current operating condition, replacing, by the industrial controller, the current control strategy with the first replacement control strategy; and in response to determining that the change in the current operating condition renders the current control strategy infeasible and that the first replacement control strategy is not feasible for the current operating condition, replacing, by the industrial controller, the current control strategy with a second replacement control strategy that is generated by a second non-deterministic search algorithm that performs a feasible path search for the second replacement control strategy.

12. The method of claim 11, wherein the executing of the industrial control program and executing of the first non-deterministic search algorithm are performed on separate processor cores of the industrial controller.

13. The method of claim 11, further comprising training, by the industrial controller using data collected from the industrial automation system, a machine learning model used by the first non-deterministic search algorithm and the second non-deterministic search algorithm to analyze the current operating condition of the industrial automation system and determine the first replacement control strategy and the second replacement control strategy.

14. The method of claim 13, wherein the training comprises:

adding, by the industrial controller, contextual information to the data collected from the industrial automation system based on first-principles information stored on the industrial controller to yield contextualized data; and training, by the industrial controller, the machine learning model using the contextualized data.

15. The method of claim 13, wherein the first-principles information is stored on an in-memory database of the industrial controller.

16. The method of claim 11, wherein the replacing of the current control strategy with the first replacement control strategy comprises modifying the industrial control program in accordance with the first replacement control strategy, and the replacing of the current control strategy with the second replacement control strategy comprises modifying the industrial control program in accordance with the second replacement control strategy.

17. A non-transitory computer-readable medium having stored thereon instructions that, in response to execution, cause an industrial controller comprising a processor to perform operations, the operations comprising:

executing an industrial control program that causes the industrial controller to monitor and control an industrial automation system in accordance with a first current control strategy;

executing a first non-deterministic search algorithm that determines, based on analysis of a current state of the industrial automation system, a first replacement control strategy estimated to improve one or more control performance metrics relative to the current control strategy, wherein the first non-deterministic search algorithm determines the first replacement control strategy using a global search;

in response to determining that a change in the current operating condition renders the current control strategy infeasible and that the first replacement control strategy generated by the first non-deterministic search algorithm is feasible for the current operating condition, replacing the current control strategy with the first replacement control strategy; and in response to determining that the change in the current operating condition renders the current control strategy infeasible and that the first replacement control strategy is not feasible for the current operating condition, replacing the current control strategy with a second replacement control strategy that is determined by a second non-deterministic search algorithm, wherein the second non-deterministic search algorithm determines the second replacement control strategy using a feasible path search.

18. The non-transitory computer-readable medium of claim 17, wherein the replacing of the current control strategy with the first replacement control strategy comprises modifying the industrial control program in accordance with the first replacement control strategy, and the replacing of the current control strategy with the second replacement control strategy comprises modifying the industrial control program in accordance with the second replacement control strategy.

19. The non-transitory computer-readable medium of claim 17, wherein the executing of the industrial control program and executing of the first non-deterministic search algorithm are performed on separate processor cores of the industrial controller.

20. The non-transitory computer-readable medium of claim 17, the operations further comprising training, using data collected from the industrial automation system, a machine learning model used by the first non-deterministic search algorithm and the second non-deterministic search algorithm to analyze the current operating condition of the industrial automation system and determine the first replacement control strategy and the second replacement control strategy.

\*   \*   \*   \*   \*